Figure 1:
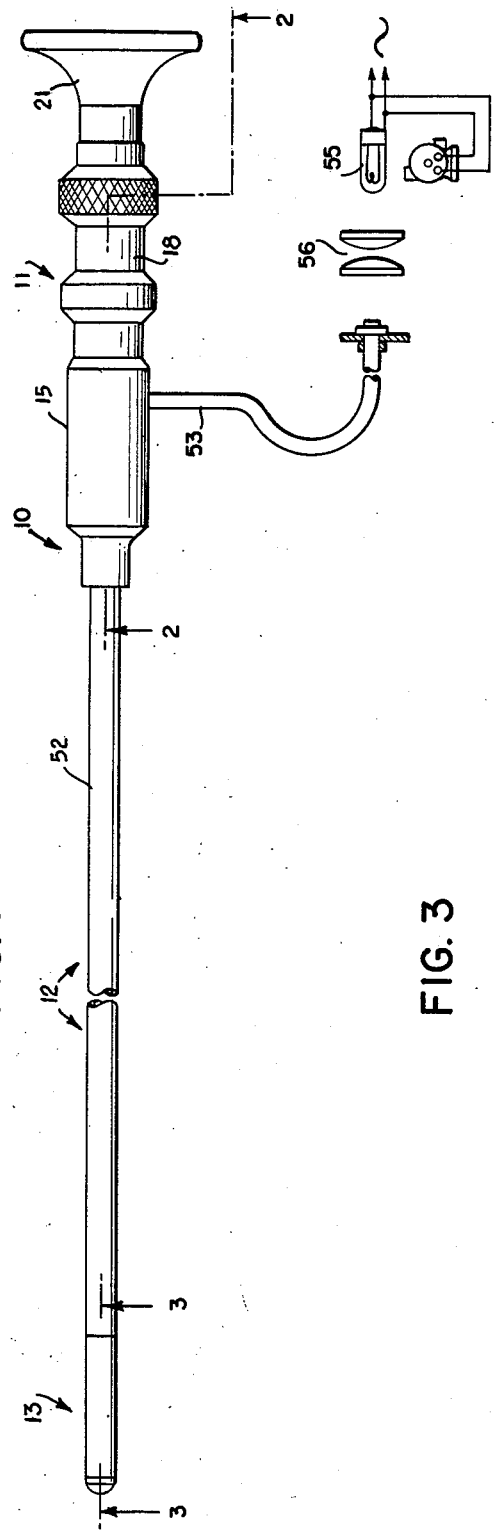

May 12, 1964  J. H. HETT  3,132,646
FLEXIBLE OPTICAL SURGICAL INSTRUMENT
Filed Oct. 18, 1961  3 Sheets-Sheet 1

May 12, 1964  J. H. HETT  3,132,646
FLEXIBLE OPTICAL SURGICAL INSTRUMENT
Filed Oct. 18, 1961  3 Sheets-Sheet 2
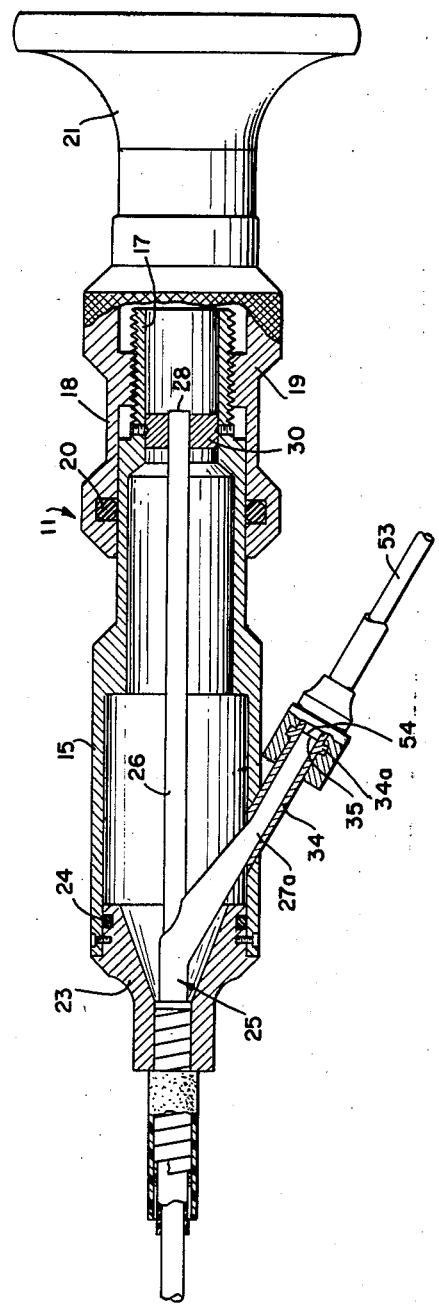

May 12, 1964 J. H. HETT 3,132,646
FLEXIBLE OPTICAL SURGICAL INSTRUMENT
Filed Oct. 18, 1961 3 Sheets-Sheet 3
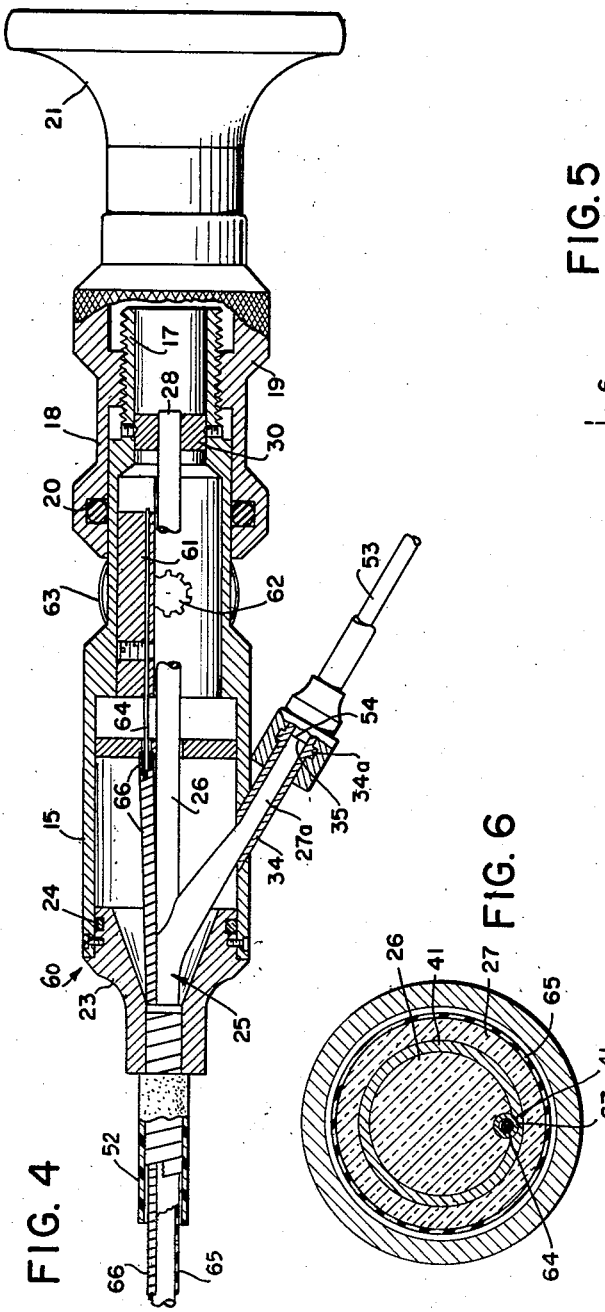
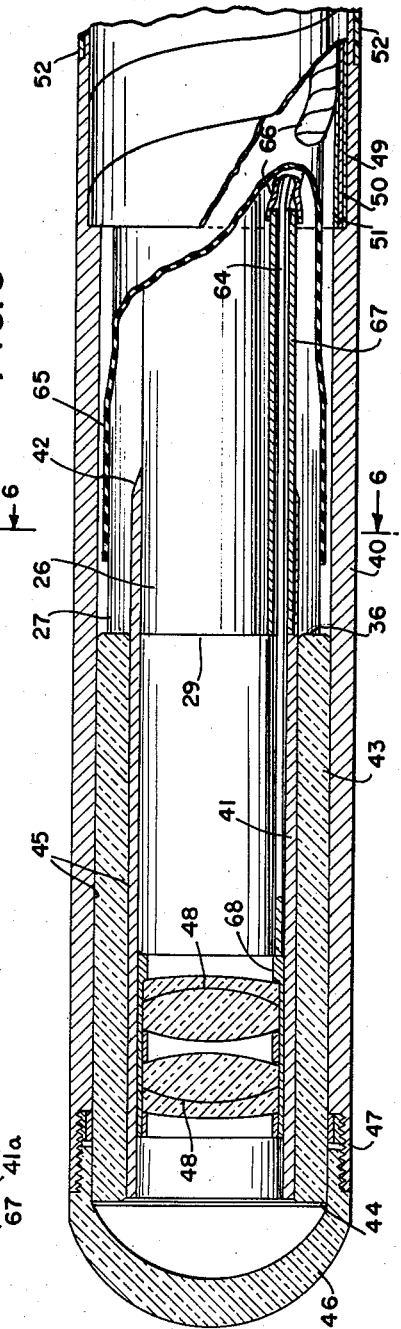

3,132,646
FLEXIBLE OPTICAL SURGICAL INSTRUMENT
John H. Hett, Cresskill, N.J., assignor to American Cystoscope Makers, Inc., Pelham Manor, N.Y., a corporation of New York
Filed Oct. 18, 1961, Ser. No. 145,916
6 Claims. (Cl. 128—6)

This invention relates to a flexible optical surgical instrument and more particularly to a flexible surgical instrument especially well suited for complete visualization of the esophagus.

Direct visualization of the esophagus is important in order that proper diagnosis and treatment may be carried out. For example, in the case of esophagitis effective diagnosis can only be made by direct inspection of the inflamed mucosa. Also, in its early stages, carcinoma of the esophagus may easily escape detection by radiologic means. Hitherto, instruments have been provided for insertion into and for direct examination of the esophagic mucosa. However, these have left much to be desired even though considerable effort has been made to minimize the risk to the patient involved in their use.

One type of instrument hitherto used for carrying out examinations of the esophagus comprises an open-ended tube through which the esophagus is maintained under view for the purpose of visually guiding the instrument as it is introduced into the esophagus. Utilization of such instruments only by highly qualified and expert surgeons does not entirely eliminate the occurrence of accidental damage such as a hypopharyngeal tear which often proves to be fatal to the patient. In order to reduce the risk to the patient inherent in the use of an open-ended esophagoscope, another type of instrument for examination of the esophagus has hitherto been provided which is closed by an obturator having a soft nose while the instrument is being inserted into the esophagus. The obturator is removed and a telescope is inserted in the instrument when it is desired to carry out the visual examination. In order to minimize the possibility of injury to the patient with this type of instrument, the esophagoscope should be guided for only relatively short distances, about one inch, with the obturator in place and then the obturator should be removed and the telescope inserted so that the area immediately ahead of the instrument can be inspected. This results, among other things, in an undue prolongation of the procedure and increased discomfort to the patient.

A serious disadvantage of the rigid instruments hitherto utilized in carrying out esophagic examinations resides in the serious danger of puncturing esophageal lesions and the aorta which is juxtaposed to the esophagus. In the event there are varices present in the esophagus, there is a risk involved in the use of the esophagoscopes hitherto available that the affected vein may be punctured which may result in the death of the patient.

It is, therefore, a principal object of this invention to provide a flexible optical instrument adapted for direct insertion into the esophagus of a patient whereby the mucosa may be safely and clearly inspected.

Another object is to provide such an instrument by means of which the entire interior of the esophagus may be examined with a single pass of the instrument thereby minimizing the duration of the operation and the discomfort caused to the patient.

A more specific object is to provide such an instrument which affords a relatively wide angle of view in the forward direction entirely about an annular segment while simultaneously dilating the esophagus and preventing damage thereto.

Figure 3:
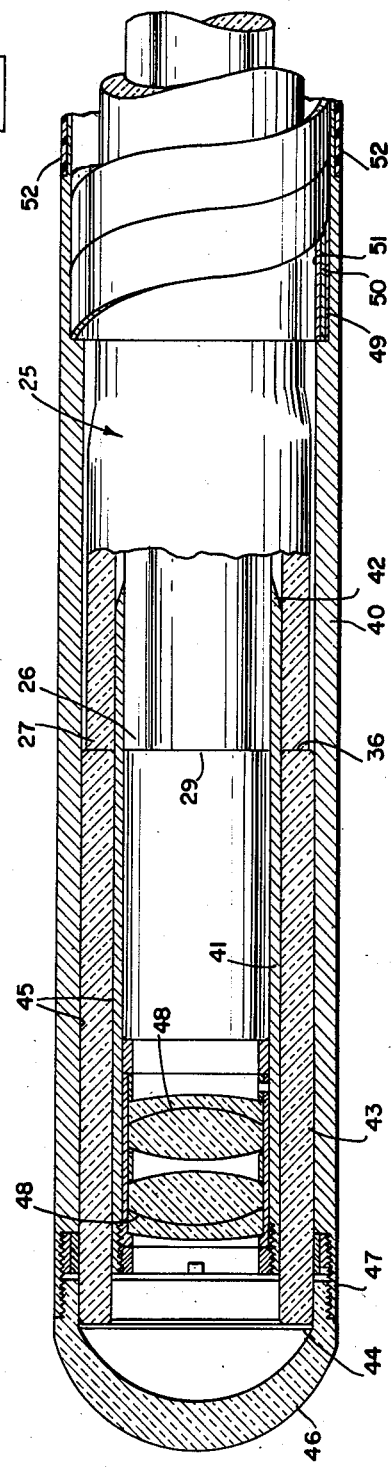

The foregoing as well as additional objects and advantages of the present invention will be apparent from the following description and the accompanying drawings in which:

FIGURE 1 is an elevational view of a flexible optical surgical instrument constructed in accordance with the present invention for examining the esophagus;

FIGURES 2 and 3 are cross sectional views on enlarged scales respectively taken through the lines 2—2 and 3—3 of FIGURE 1;

FIGURES 4 and 5 are cross sectional views similar to FIGURES 2 and 3 of a further embodiment of the present invention; and FIGURE 6 is a sectional view through the line 6—6 of FIGURE 5.

Referring now to the drawings in detail, flexible surgical instrument 10 is an esophagoscope and comprises an eyepiece assembly 11 joined to one end, the proximal end, of an elongated flexible tubular assembly 12 which in turn terminates in an objective or viewing head indicated generally at 13.

Eyepiece assembly 11 may comprise a generally tubular body member 15 having an externally threaded portion 17 of reduced diameter at its proximal end. An eyepiece rotor 18 having an internally threaded portion 19 engaging the threaded portion 17, extends in telescoping relation over the body member 15. An O-ring 20 seated in an annular recess formed in the rotor 18 adjacent to its distal end provides a sliding seal with the outer surface of the body member 15. An eyepiece 21 carrying suitable magnifying and focusing lenses (not shown) is fitted to the end of the rotor 18 for axial movement therewith when the rotor is rotated relative to the body member 15.

The end of the body member 15 remote from the eyepiece is connected to an adapter 23 having a central bore through which extends an optical light and image-conducting bundle indicated generally at 25. An O-ring 25 seated in an annular recess formed in the adapter 23 serves to seal the connection between the body member 15 and the adapter 23.

The light and image-conducting bundle 25 is formed of a large number of extremely small diameter light-conducting fibers which when tightly packed together as at the opposite ends of the bundle may have a diameter of about .326 inch and may contain as many as 240,000 or more glass-coated glass fibers each of which extends from end to end of the bundle. The fiber bundle 25 may be manufactured as described in the co-pending application of Lawrence E. Curtiss filed December 19, 1960, Serial No. 76,868. The light and image-conducting bundle 25 comprises an image-conducting section 26, the fibers of which are mutually oriented at the opposite optically polished end faces 28 and 29 so that an image presented to the objective end face 29 is conducted along the bundle and presented at the eyepiece or proximal end face 28 where it is magnified and focused on the eye of a viewer through the eyepiece 21. The rigidified proximal end portion of the image-carrier section 26 carries a collar 30 which is clamped within the body member 15 by set screws as shown in FIGURE 2.

The bundle 25 also comprises a light-conducting section 27 the fibers of which surround the image-conducting section 26 from the distal end of the bundle to adjacent the proximal end of the image-conducting section 26. As shown in FIGURE 2, the fibers forming the light-conducting section 27 are gathered together within the body member 15 to form a rod-like extension 27a which diverges from the image-conducting section 26 and extends through an opening in the wall of the body member 15 into a laterally projecting arm 34 where it is sealed by a suitable cement. The arm 34 terminates in a female Luer lock connector 34a by means of which the end face 35 of the rod-like extension may be coupled to the end face 54 of a flexible light-conductor 53 as will be more fully described hereinbelow.

The fiber bundle 25 may be approximately twenty-four inches long and at its distal end extends into a cover tube 40 which has an outer diameter, in the present instance, of about .435 inch. The tube 40 being rigid, its length is preferably short, less than two inches, to facilitate insertion and manipulation of the instrument. A tubular lens holder 41 has its proximal end tapered to a feather edge as indicated at 42 which is positioned in the distal end portion of the bundle 25 so as to separate the central image-conducting section 26 from the surrounding annular array of fibers forming the light-conducting section 27. A cylindrical member 43 formed of glass or other suitable light-conducting material encloses the lens holder 41 and is fixed between the latter and the tube 40, the annular proximal end face of the member 43 being juxtaposed to the annular end face 36 of the light-conducting section so that light transmitted by the fibers of section 27 enters the wall of the glass member 43 and passes out through its annular distal end face 44. In order to minimize light loss along the glass member 43, its inner and outer cylindrical surfaces are coated as indicated at 45 with a highly reflective material such as silver.

A smoothly rounded spherical lens 46 secured in a ring 47 on to the distal end of the cover tube 40 serves to close the latter. The spherical lens 46 is constructed for operation simultaneously as an obturator at the distal end of the instrument, as a dilater for the esophagus, and as a lens through which the mucosa is illuminated and viewed as will be more fully pointed out hereinafter. In the present embodiment the lens 46 is of approximately zero power and has an outer radius of curvature of about .230 inch, an inner radius of curvature of about .2054 inch and a central thickness of about .075 inch.

As indicated in FIGURE 3, a fixed focus lens system made up of lenses 48 is mounted within the lens holder 41 so as to form an image of the field viewed through the spherical lens 46, on the end face 29 of the image-conducting section.

For the purpose of providing a necessary degree of rigidity so that the instrument may be readily manipulated but without impairing the desired flexibility of the assembly 12, three resilient spiral members 49, 50 and 51 formed of stainless steel or other suitable material encircle the light and image-conducting bundle 25. The proximal ends of the spiral members 49–51 are secured to each other and to the adapter 23. The distal ends of the spiral members 49–51 extend into the cover tube 40 and are secured together to the tube 40. A thin walled tube 52 formed of latex or other suitable material such as polyvinyl chloride encloses the spiral members 49–51 and is cemented at its opposite ends to the adapter 23 and the cover tube 40.

A high intensity light source is coupled with the light carrier extension 27a to provide illumination of the field of view when the instrument 10 is in use. For this purpose, the flexible fiber light carrier 53 which receives light from a high intensity lamp 55 through a condenser 56, is connected to extension 27a.

With the light-conducting section 27 connected to a source of light, the distal tip of the instrument 10 may be introduced and guided along the esophagus of the patient. The smoothly rounded spherical lens 46 not only permits direct forward visualization of an entire annular sector but also functions as a smoothly rounded obturator in preventing damage to the pharynx on introduction of the instrument into the esophagus. The lens 46 also has the function of dilating the esophagus and smoothing out the wrinkles in the mucosa as the latter slides over the surface of the lens. This as well as the fact that an annular sector extending completely around the interior of the esophagus may be viewed through the lens system permits visualization and inspection of the entire esophagus in a single pass. Thus, not only may the discomfort hitherto experienced by a patient during the carrying out of esophagoscopy be greatly reduced but also the instrument may be used with enhanced efficiency. For example, the possibility of skipping over a relatively small cancerous area is eliminated.

Turning now to FIGURES 4, 5 and 6, esophagoscope 60 is similar to instrument 10 except as will now be pointed out. In order to avoid unnecessary repitition, the same reference characters are used in FIGURES 4–6 as were used to identify the corresponding parts of the instrument 10 in FIGURES 1–3. Thus, esophagoscope 60 comprises an eyepiece assembly 11 which is identical to that described in connection with FIGURE 2. A slide block 61 is slidably supported within the tubular body member 15, and carries an elongated rack which is engaged by a pinion 62 which is in turn connected to a rotatable control knob 63 mounted externally of the member 15. As shown, a control wire 64 extends into a recess formed in the slide block 61 where it is clamped in place. The control wire 64, enclosed within a flexible spiral enclosure 66, extends along the elongated flexible tubular assembly 12 within the spiral members 49–51; the proximal end of the spiral enclosure 66 being anchored to the body member 15.

When, as in the present instance, the light and image-conducting bundle is enclosed intermediate its opposite ends within a flexible rubber latex or plastic sheath 65, the spiral enclosure 66 preferably extends externally of the sheath 65 to a point adjacent the distal end of the fiber bundle. As shown most clearly in FIGURE 5, the spiral enclosure 66 extends into the sheath 65 through an opening sealed by a suitable cement which serves to secure the sheath 65 to the spiral enclosure 66. Within the plastic sheath 65, the spiral enclosure 66, with the control wire 64 extending therein, is threaded among the loose fibers of the fiber bundle 25 to the proximal end of an elongated tubular member 67. This tubular member 67 is anchored in a longitudinal groove 41a formed in the inner surface of the lens holder 41 and extends from the distal end of the image-conducting section for about one-half inch to where its proximal end is connected to the spiral enclosure 66. The control wire 64 extends through the member 67 into the interior of the lens holder 41 and is connected to a generally tubular lens cell 68. The lens cell 68 carries objective lenses 48 and is slidably mounted within the lens holder 41.

The esophagoscope 60 is used as was described in connection with the instrument 10 except that by manipulation of the control knob 63, the focus of the field of view presented to the spherical lens 46 may be readily adjusted so that a sharp image thereof is formed on the distal end face 29 of the image-conducting section of the fiber bundle. Rotation of the control knob 63, in one direction or the other, is transmitted through the pinion 62 to cause longitudinal movement of the slide block 61 within the body member 15. Movement of the slide block is transmitted to the lens cell 68 to shift the same in a corresponding direction and for a corresponding distance.

In the embodiments shown, the combined magnification afforded by the objective and eyepiece lenses may be as much as 30 times or more. The embodiment shown in FIGURES 4–5, in which the objective can be adjusted to provide a sharp image, is particularly advantageous when high magnification is desired.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

I claim:
1. An esophagoscope for insertion through the mouth into the esophagus of a patient, comprising a housing, elongated flexible light and image-conducting means having its proximal end portion extending into said housing, said light and image-conducting means including two groups of a very large number of extremely fine light-conducting fibers with one group of fibers being adapted to illuminate a field presented to the distal end of the other group of fibers and said other group of fibers being adapted to conduct an image of said field from the distal to the proximal end thereof, means for connecting the proximal end of said one group of fibers to a source of light, means connected to the distal end of said light and image-conducting means for engaging and dilating the esophageal mucosa and forming an image thereof on the distal end of said other group of fibers comprising a spherically shaped substantially zero power lens forming the distal tip of said esophagoscope, the distal end surface of the light-conducting means extending in close juxtaposed relation with the interior surface of said spherically shaped lens, and means on said housing for viewing the image on the proximal end of said other group of fibers.

2. An esophagoscope for insertion through the mouth of a patient, comprising a housing, elongated flexible light and image-conducting means having its proximal end portion extending into said housing, said light and image-conducting means including two groups of a very large number of extremely fine light-conducting fibers with one group of fibers being adapted to illuminate a field presented to the distal end of the other group of fibers and said other group of fibers being adapted to conduct an image of said field from the distal to the proximal end thereof, the proximal end portion of said one group of fibers forming a rod-like extension diverging laterally from the proximal end portion of said other group of fibers in said housing, means for connecting the proximal end of said rod-like extension to a source of light, means for engaging and dilating the esophageal mucosa and forming an image thereof on the distal end of said other group of fibers comprising a spherically shaped substantially zero power lens forming the extreme distal tip of said esophagoscope, the distal end surface of the light-conducting means extending in close juxtaposed relation with the interior surface of said spherically shaped lens, and means on said housing for viewing the image on the proximal end of said other group of fibers.

3. An esophagoscope for insertion through the mouth into the esophagus of a patient, comprising a housing, elongated flexible light and image-conducting means having its proximal end portion extending into said housing, said light and image-conducting means including two groups of a very large number of extremely fine light-conducting fibers with one group of fibers being adapted to illuminate a field adjacent to the distal end of the other group of fibers and said other group of fibers being adapted to conduct an image of said field from the distal to the proximal end thereof, the proximal end portion of said one group of fibers forming a rod-like extension diverging laterally from the proximal end portion of said other group of fibers in said housing, means for connecting the proximal end of said rod-like extension to a source of light, a tubular member enclosing and extending distally beyond the distal end portion of said light and image-conducting means, a spherically shaped substantially zero power lens connected to and closing the distal end of said tubular member, said spherical lens forming the distal tip of said esophagoscope and being adapted to engage and dilate the esophageal mucosa, objective lens means within said tubular member for forming an image on the distal end of said other group of fibers of the field presented to said spherical lens, the distal end of the light-conducting means extending beyond the distal end of said other group of fibers with its distal end surface in close juxtaposed relation with the interior surface of said spherically shaped lens, and means on said housing for viewing the image of said field on the proximal end of said other group of fibers.

4. An esophagoscope for insertion through the mouth into the esophagus of a patient, comprising a housing, elongated flexible light and image-conducting means having its proximal end portion extending into said housing, said light and image-conducting means including two groups of a very large number of extremely fine light-conducting fibers with one group of fibers being adapted to illuminate a field adjacent to the distal end of the other group of fibers and said other group of fibers being adapted to conduct an image of said field from the distal to the proximal end thereof, the proximal end portion of said one group of fibers forming a rod-like extension diverging laterally from the proximal end portion of said other group of fibers in said housing, means for connecting the proximal end of said rod-like extension to a source of light, a tubular member enclosing and extending distally beyond the distal end portion of said light and image-conducting means, a spherically shaped substantially zero power lens connected to and closing the distal end of said tubular member, said spherical lens forming the distal tip of said esophagoscope and being adapted to engage and dilate the esophageal mucosa, a tubular lens holder extending within said tubular member connected to said light and image-conducting means between the distal end portions of said groups of fibers, objective lens means supported in said lens holder for forming an image on the distal end of said other group of fibers of the field presented to said spherical lens, said one group of fibers forming a distal end-face extending annularly about said lens holder, a tubular light-conducting member adapted to transmit light longitudinally through the wall thereof, said light-conducting member extending longitudally about said lens holder and within said tubular member with one end thereof juxtaposed to said annular end face and the other end surface thereof juxtaposed to the interior surface of said spherical lens, and means on said housing for viewing the image of said field on the proximal end of said other group of fibers.

5. An esophagoscope for insertion through the mouth into the esophagus of a patient, comprising a housing, elongated flexible light and image-conducting means having its proximal end portion extending into said housing, said light and image-conducting means including two groups of a very large number of extremely fine light-conducting fibers with one group of fibers being adapted to illuminate a field presented to the distal end of the other group of fibers and said other group of fibers being adapted to conduct an image of said field from the distal to the proximal end thereof, means for connecting the proximal end of said one group of fibers to a source of light, means connected to the distal end of said light and image-conducting means for engaging and dilating the esophageal mucosa and forming an image thereof on the distal end of said other group of fibers comprising a spherically shaped substantially zero power lens forming the distal tip of said esophagoscope, an objective lens cell movably supported intermediate said spherically shaped lens and the distal end of said other group of fibers, a flexible control wire connected to said lens cell and extending along said light and image-conducting means to said housing, means on said housing and connected to said control wire for shifting said control wire and said lens cell, the distal end of the light-conducting means extending beyond the distal end of said other group of fibers with its distal end surface in close juxtaposed relation with the interior surface of said spherically shaped lens, and means on said housing for viewing the image on the proximal end of said other group of fibers.

6. An esophagoscope for insertion through the mouth into the esophagus of a patient, comprising a housing, elongated flexible light and image-conducting means having its proximal end portion extending into said housing, said light and image-conducting means including two groups of a very large number of extremely fine light-conducting fibers with one group of fibers being adapted to illuminate a field adjacent to the distal end of the other group of fibers and said other group of fibers being adapted to conduct an image of said field from the distal to the proximal end thereof, the proximal end portion of said one group of fibers forming a rod-like extension diverging laterally from the proximal end portion of said other group of fibers in said housing, means for connecting the proximal end of said rod-like extention to a source of light, a tubular member enclosing and extending distally beyond the distal end portion of said light and image-conducting means, a spherically shaped substantially zero power lens connected to and closing the distal end of said tubular member, said spherical lens forming the distal tip of said esophagoscope and being adapted to engage and dilate the esophageal mucosa, a tubular lens holder extending within said tubular member connected to said light and image-conducting means between the distal end portions of said groups of fibers, an objective lens cell slidably supported in said lens holder, objective lens means in said cell for forming an image on the distal end of said other group of fibers of the field presented to said spherical lens, the distal end portion of said one group of fibers being disposed in an annular array about the distal end portion of said other group of fibers and forming a distal end-face extending annularly about said lens holder, an open-ended tubular member extending longitudinally along the distal end portion of said other group of fibers and said lens holder, a flexible control wire connected to said lens cell, said control wire extending through said open-ended tubular member and along said light and image-conducting means into said housing, means including a slide member in said housing for shifting said lens cell toward and away from the distal end of said other group of fibers to focus said image, a tubular light-conducting member adapted to transmit light longitudinally through the wall thereof, said light-conducting member extending longitudinally about said lens holder and within said tubular member with one end thereof juxtaposed to said annular end face and the other end surface thereof juxtaposed to the interior surface of said spherical lens, and means on said housing for viewing the image of said field on the proximal end of said other group of fibers.

References Cited in the file of this patent

UNITED STATES PATENTS

| | | |
|---|---|---|
| 2,987,960 | Sheldon | June 13, 1961 |
| 3,010,357 | Hirschowitz | Nov. 28, 1961 |

FOREIGN PATENTS

| | | |
|---|---|---|
| 158,149 | Great Britain | Feb. 3, 1921 |

OTHER REFERENCES

Kapany article in the Strong book "Concept of Classical Optics," 1958, pp. 565–567.